Nov. 21, 1939. H. C. BOWEN 2,180,455
FLUID PRESSURE PRODUCING DEVICE
Filed May 20, 1937
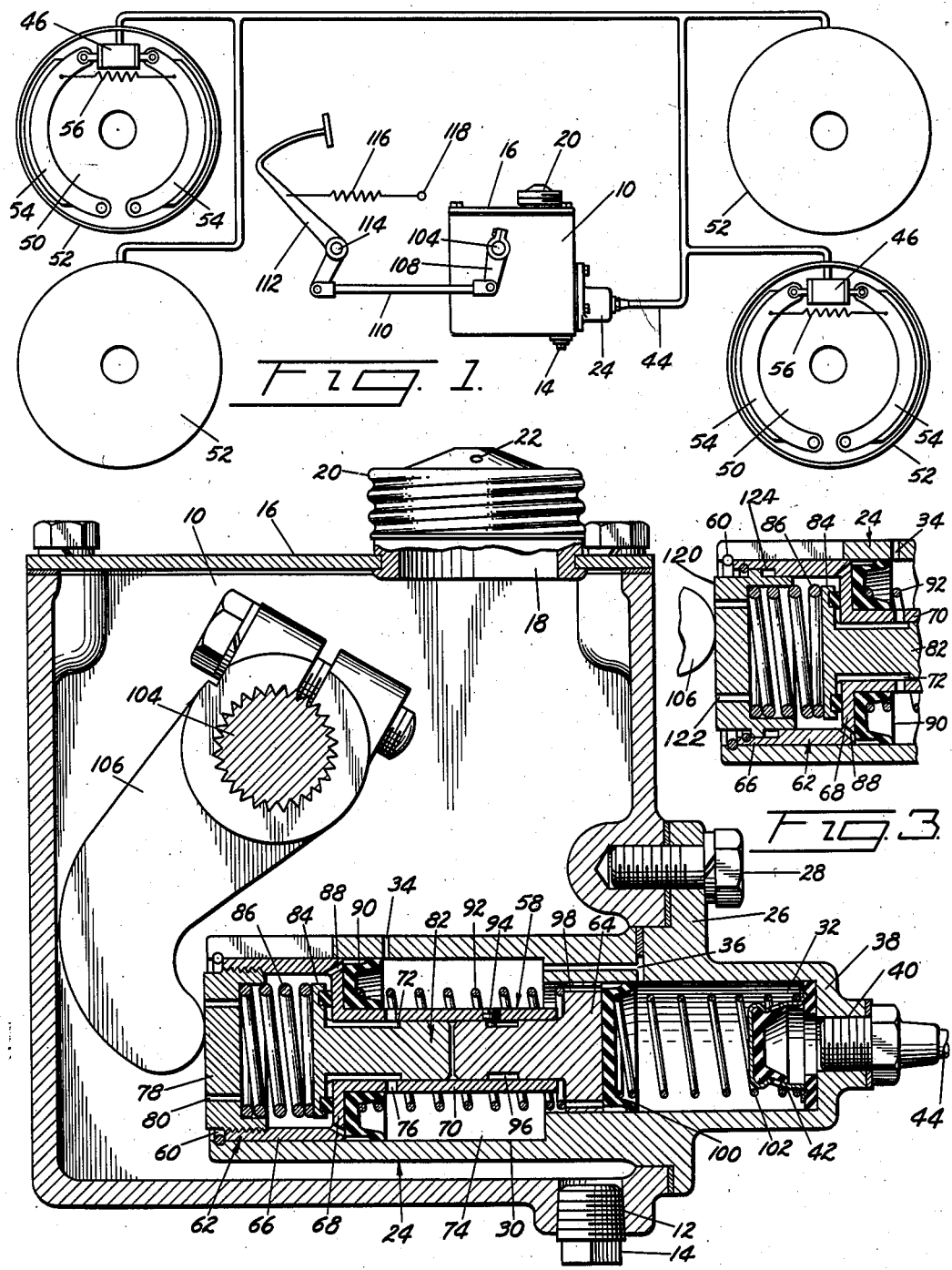
INVENTOR.
HERBERT C. BOWEN
BY Williams, Bradbury
McCaleb & Hinkle.
ATTORNEYS.

Patented Nov. 21, 1939

2,180,455

UNITED STATES PATENT OFFICE 2,180,455

FLUID PRESSURE PRODUCING DEVICE

Herbert C. Bowen, Detroit, Mich., assignor to Hydraulic Brake Company, Detroit, Mich., a corporation of California Application May 20, 1937, Serial No. 143,694

5 Claims. (Cl. 60—54.6)

This invention relates to fluid pressure braking systems for motor vehicles, and more particularly to fluid pressure producing devices for such systems.

Broadly the invention comprehends a fluid pressure braking system including a pressure producing device wherein the pressure may be automatically compounded without increase in the applied force.

An object of the invention is to provide a fluid pressure producing device of the compound type wherein the transition from low to high pressure may be effected without increase in the applied force and without shock.

Another object of the invention is to provide a fluid pressure producing device for a fluid pressure braking system wherein transition from low to high pressure may be spread over a relatively long period so as to smooth out the operation of the device.

A further object of the invention is to provide a fluid pressure braking system including a pressure producing device operative to automatically compound the pressure and to accomplish the transition from low to high pressure without increase in the applied force and to so effect this change that the operation of the device will be smoothed out.

Other objects and advantages of the invention will appear from the following description taken in connection with the drawing forming a part of this specification, and in which, Fig. 1 is a diagrammatical illustration of a fluid pressure braking system embodying the invention;

Fig. 2 is a vertical sectional view of the fluid pressure producing device; and

Fig. 3 is a fragmentary view illustrating the modified form of the invention.

Referring to the drawing for more specific details of the invention, 10 represents a fluid reservoir having a drain opening 12 which may be closed as by a plug 14. The reservoir also has a removable top 16 provided with a filling opening 18 which may be closed as by a cap 20 having suitable openings 22 for venting the reservoir to the atmosphere.

A cylinder 24 mounted in an opening in the wall of the reservoir adjacent the bottom thereof has a radial flange 26 secured to the wall of the reservoir by bolts 28 so as to support the cylinder partly within and partly outside of the reservoir. The cylinder includes a large chamber 30 and a relatively small chamber 32 arranged concentrically to and communicating with one another.

The large chamber 30 opens into the reservoir and has in its wall a port 34 providing another communication between the cylinder and the reservoir. A passage 36 in the wall of the cylinder provides a communication between the large chamber 30 and the small chamber 32, and the small chamber has a head 38 provided with a discharge port 40 controlled as by a two-way valve 42.

A fluid pressure pipe or conduit 44 connected to the discharge port 40 has a plurality of branches connected respectively to fluid pressure actuated motors 46 arranged in pairs, one pair for actuating the brakes associated with the front wheels of a vehicle and another pair for actuating the brakes associated with the rear wheels of the vehicle.

The brakes are of conventional type each including a fixed support or backing plate 50 which may be secured to an axle or to an axle housing, a drum 52 associated with the backing plate which may be secured to a wheel, a pair of corresponding interchangeable friction elements or shoes 54 having their articulate ends pivoted on the backing plate, and a motor corresponding to the motors 46 mounted on the backing plate between the separable ends of the shoes and operative to spread the shoes into engagement with the drum 52 against the resistance of a retractile spring 56 connected between the shoes.

A compound piston 58 reciprocable in the cylinder 24 is held against displacement by a retaining ring 60 seated in a circumferential groove in the wall of the cylinder adjacent the open end of the large chamber 30. The compound piston includes a large piston 62 movable in the large chamber 30, and a small piston 64 movable in the small chamber 32. The large piston includes a shell 66 open at one end and closed at its other end as by a head 68. The head has thereon a concentric hollow extension 70 providing a chamber 72 communicating with the interior of the shell, and also providing in conjunction with the wall of the cylinder 24 an annular chamber 74. The hollow extension 70 has a plurality of ports 76 providing communications between the chambers 72 and 74.

A thrust block 78 secured in the open end of the shell 66 has a plurality of passages 80 providing communications between the reservoir and the interior of the shell 66. A valve 82 slidable in the chamber 72 has a head 84 adapted to seat on the back of the head 68 of the piston 62 so as to control the communication between the chamber 72 and the interior of the shell, and a heavy spring 86 interposed between the head 84 of the valve and the thrust block 78 urges the valve to its closed position.

The head 68 of the piston 62 has a plurality of spaced ports 88 providing communications between the interior of the shell and the annular chamber 74, and a collapsible leak-proof cup 90 seated on the head 68 controls the ports 88. A heavy spring 92 interposed between the cup 90 and the small piston 64 serves to retain the cup 90 against displacement and also to yieldingly support the small piston.

As shown, the small piston 64 had a concentric extension on its back slidable in the hollow chamber 72, and a set screw 94 in the wall of the chamber engages a slot 96 so as to retain the piston against displacement. A plurality of passages 98 in the head of the small piston provide communications between the large chamber 30 and the small chamber 32, and a collapsible leakproof cup 100 seated on the head of the small piston controls the passages 98. A light spring 102 interposed between the cup and the two-way valve 42 serves to retain the cup and the valve against displacement, and the spring also serves to return the piston to its retracted position.

A rotatable shaft 104 mounted transversely of the reservoir has keyed thereto within the reservoir an actuator 106 engaging the thrust block 78, and an arm 108 suitably secured to the shaft outside of the reservoir is connected as by a rod 110 to a foot pedal lever 112 pivotally mounted as indicated at 114 and connected by a retractile spring 116 to a fixed support 118.

A modification of the invention is illustrated in Fig. 3 wherein the thrust block 78 is slidable in the shell 66 of the large piston 62 so that the load on the spring 86 may be varied proportionately to the operating force applied through the actuator 106 to the thrust block.

Assuming that the system is properly installed and filled with fluid, under these conditions, upon depressing the foot pedal lever 112 force is transmitted from the lever through the rod 110 and the arm 108 to the shaft 104, resulting in moving the shaft through an angle. This movement of the shaft is transmitted through the actuator 106 on the shaft 104 to the piston 62 causing movement of the piston on its compression stroke.

During the initial movement of the piston, the cup 90 on the large piston 62 covers the port 34, and the cup 100 on the small piston 64 closes the passage 36. Thereafter, as the piston proceeds on its compression stroke, the pressure on the fluid in the cylinder is received on the cup 90 on the large piston 62, and as the piston proceeds the fluid in the large chamber 30 is displaced therefrom through the ports 98 in the head of the small piston 54 past the cup 100 into the small chamber 32, thence past the two-way valve 42, through the port 40 and the fluid delivery pipe or conduit 44, into the fluid pressure actuated motors 46, causing actuation of the motors and resulting in movement of the friction elements 54 into engagement with the drum 52 so as to effectively retard rotation of the drum.

Upon attaining a predetermined pressure on the fluid in the cylinder sufficient to overcome the load on the spring 86, the valve 82 trips and releases the pressure on the fluid in the large chamber 30, and simultaneously therewith the pressure on the fluid in the chamber 32 is received on the cup 100 on the head of the small piston 64 supported by the spring 92. The pressure received on the cup 100 is insufficient to overcome the load on the spring 92, and, accordingly, the piston 64 supporting the cup does not recede at the time.

When the valve 82 trips and releases the pressure on the fluid in the large chamber 30, a small quantity of the fluid is returned from the large chamber through the port 76, past the valve 82, through the piston 66 and ports 80 into the reservoir.

Due to this release of pressure on the fluid in the large chamber 30, the valve 82 is urged to its seat under the influence of the spring 86. Under these conditions, as the piston advances on its compression stroke pressure on the fluid in the large chamber 30 is again built up, and simultaneously therewith the pressure in the small chamber 32 is increased. This increase of pressure on the fluid in the small chamber causes the small piston 64 to recede against the resistance of the spring 92 and to engage the valve 82. Thus the force now tending to open the valve 82 is equal to the pressure on the fluid in the large chamber 30 augmented by the force transferred to the valve from the small piston 64 receding under the pressure on the fluid in the small chamber 32. Under these conditions the valve 82 opens gradually throughout the remainder of the advance stroke of the piston, the resistance to the advance of the large piston is gradually dissipated as the resistance to advance of the small piston increases, and at no time is there any abrupt change in the resistance offered by the pistons to the advance movement thereof.

After the low pressure piston has been rendered inoperative by the opening of the valve 82 and the by-passing of fluid through the passage controlled by this valve, the high and low pressure chambers are segregated by the cup 100 associated with the high pressure piston 64. Thereafter all force exerted by the operator on the foot pedal is applied to the high pressure piston which functions to create a fluid pressure proportional to the force exerted by the operator. Since the area of the high pressure piston 64 is small and the linkage and the brake pedal multiply the force exerted by the operator, it is possible for the operator to obtain a strong braking action with the exertion of a relatively small force.

In the modification of the invention, a thrust block 120 having spaced openings 122 for the passage of fluid is slidably mounted as indicated at 124; hence the load on the spring 86 is variable. This results in increasing the load on the valve 82 proportionately to the increase in the applied operating force. Under these conditions, the pressure on the fluid in the large chamber 30 will of necessity be considerably higher to effect the initial cracking of the valve 82 and the transfer of pressure from the cup 90 on the head of the large piston 62 to the cup 100 on the head of the small piston 64. It also renders more positive the action of the spring 86 in closing the valve after the initial release of pressure on the fluid in the large chamber 30 and in addition thereto most effectively retards the opening of the valve when acted upon by the combined pressures on the fluid in the large chamber 30 and in the small chamber 32 received by the small piston and transmitted therefrom to the valve.

Upon release of the applied force on the foot pedal lever 112, this lever is returned to its normal position by the retractile spring 116, and during this movement of the foot pedal lever the piston is returned to its retracted position under the influence of the return springs 92 and 102. As the piston returns to its retracted position the fluid in the fluid pressure actuated motors 46 and the fluid pressure delivery line connecting the motors to the cylinder is returned to the cylinder under the pressure of the retractile springs 56 connected between the friction elements 54 of the respective brake structures.

Due to friction on the column of fluid in the fluid pressure delivery line 44 connecting the fluid pressure actuated motors 46 to the cylinder, and to the tension on the retractile springs 92 and 102, the piston returns to its retracted position slightly in advance of the return of the fluid to the cylinder. This causes a partial vacuum in the cylinder, resulting in collapse of the cup 90 on the head of the piston 62 and the cup 100 on the head of the piston 64 and causes suction of fluid from the reservoir into the cylinder.

Upon complete return of the piston to its retracted position, the port 34 and the by-pass 36 are uncovered, and under these conditions, any excess fluid returned to the cylinder from the fluid pressure actuated motors 46 and the fluid pressure delivery line connecting these motors to the cylinder passes from the cylinder through the by-pass and port to the reservoir.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. A fluid pressure producing device comprising a reservoir, a cylinder supplied therefrom including a large and a small chamber, a piston reciprocable in the cylinder including spaced heads movable in the respective chambers, a sleeve slidably connecting the heads, a spring on the sleeve yieldingly supporting one of the heads, a valve in the other head adapted to be actuated by the yieldingly supported head, and a spring for said valve yieldable under a fluid pressure less than the fluid pressure required to overcome said first mentioned spring whereby said valve operates independently of said head.

2. A fluid pressure producing device comprising a reservoir, a cylinder supplied therefrom having a large and a small chamber, a piston reciprocable in the cylinder having spaced heads movable in the respective chambers, a sleeve carried by one of the heads and slidably connected to the other head, a spring on the sleeve yieldingly supporting the slidably connected head, a valve in the head carrying the sleeve adapted to be actuated by the head slidably connected to the sleeve, and a spring for said valve yieldable under a fluid pressure less than the fluid pressure required to overcome said first mentioned spring whereby said valve operates independently of said head.

3. A fluid pressure producing device comprising a reservoir, a cylinder supplied therefrom including a large and a small chamber, a piston reciprocable in the cylinder including spaced heads movable in the respective chambers, a sleeve carried by and opening through the head in the large chamber and slidably connected to the head in the small chamber, a spring on the sleeve yieldingly supporting the head in the small chamber, a valve in the head in the large chamber having a stem slidable in the sleeve for cooperation with the head in the small chamber, and a spring for said valve yieldable under a fluid pressure less than the fluid pressure required to overcome said first mentioned spring whereby said valve operates independently of said head.

4. A fluid pressure producing device comprising a reservoir, a cylinder supplied therefrom including a large and a small chamber, a piston reciprocable in the cylinder including a head movable in the large chamber having passages therethrough and a concentric port, means controlling the passages, a sleeve on the head communicating with the port having openings therein communicating with the cylinder, a head movable in the small chamber having a part slidable in the sleeve and passages therethrough, means controlling the passages, a spring on the sleeve yieldingly supporting the head in the small cylinder, a valve on the back of the head in the large chamber having a stem slidable in the sleeve for cooperation with the extension on the back of the head in the small chamber, and a spring for said valve yieldable under a fluid pressure less than the fluid pressure required to overcome said first mentioned spring whereby said valve operates independently of said head.

5. A fluid pressure producing device comprising a reservoir, a cylinder supplied therefrom including a large and a small chamber, a piston reciprocable in the cylinder including spaced heads movable in the respective chambers, said heads being movable relative to each other, a spring for separating said heads, a passage by-passing the larger head, a valve in said passage, said valve and smaller head having abutting parts whereby said valve is actuated by said head, and a spring for holding said valve in closed position, said valve spring being yieldable under a fluid pressure less than that required to compress said first mentioned spring whereby said valve opens independently of said smaller head.

HERBERT C. BOWEN.